(12) United States Patent
Challener (10) Patent No.: US 11,435,252 B2
(45) Date of Patent: Sep. 6, 2022

(54) GAS SENSOR SYSTEM

(71) Applicant: William Albert Challener, Glenville, NY (US)

(72) Inventor: William Albert Challener, Glenville, NY (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 346 days.

(21) Appl. No.: 16/398,659

(22) Filed: Apr. 30, 2019

(65) Prior Publication Data
US 2019/0339151 A1   Nov. 7, 2019

Related U.S. Application Data

(60) Provisional application No. 62/665,211, filed on May 1, 2018.

(51) Int. Cl.
  *G01M 3/04* (2006.01)

(52) U.S. Cl.
  CPC ...................... *G01M 3/04* (2013.01)

(58) Field of Classification Search
  CPC . F17D 5/02; G01M 3/22; G01M 3/04; G01M 3/165; G01M 3/18; G01M 3/222
  See application file for complete search history.

(56) References Cited

U.S. PATENT DOCUMENTS 3,547,272 A * 12/1970 Kalish .................... B01D 69/10
                                              210/321.87
3,964,292 A *  6/1976 Jackson .................. G01M 3/04
                                              73/40.5 R
3,977,233 A *  8/1976 Issel .......................... F17D 5/02
                                              73/40.5 R (Continued)

FOREIGN PATENT DOCUMENTS

DE   10008969 A1 *  9/2001  ......... G01N 33/4972
WO   2016005280 A1    1/2016
WO   2017196449 A1   11/2017

OTHER PUBLICATIONS

International Search Report and Written Opinion for International Application No. PCT/US2019/029914; International Filing Date Apr. 30, 2019; Report dated Aug. 14, 2019 (pp. 1-8).

(Continued)

*Primary Examiner* — David A. Rogers
(74) *Attorney, Agent, or Firm* — Cantor Colburn LLP (57) ABSTRACT

A gas sensor system includes a sensing tube having an outer surface, and an inner surface defining a passage. A plurality of openings is formed through the outer surface and the inner surface. Each of the plurality of openings being no greater than 0.5 millimeters (mm) in diameter. A hydrophobic sealant layer covers the sensing tube. A protective layer covers the hydrophobic sealant layer. A sensor node is arranged along the sensing tube. The sensor node includes an inlet, an outlet, and an interior chamber arranged between the inlet and the outlet. A sensor element is arranged in the sensor node. The sensor element includes a first end and a second end. A sensor cable extends along the sensing tube. The sensor cable includes a first section connected to the first end of the sensor element and a second section connected to the second end of the sensor element.

14 Claims, 6 Drawing Sheets

(56) References Cited

U.S. PATENT DOCUMENTS

| | | | | |
|---|---|---|---|---|
| 3,995,472 A * | 12/1976 | Murray | | F17D 5/02 73/40 |
| 4,029,889 A * | 6/1977 | Mizuochi | | G01M 3/045 174/11 R |
| 4,047,437 A * | 9/1977 | Brooks | | G01N 1/2247 73/863.23 |
| 4,189,938 A * | 2/1980 | Heim | | G01M 3/22 73/40.7 |
| 4,206,632 A * | 6/1980 | Suzuki | | G01M 3/165 174/11 R |
| 4,450,711 A * | 5/1984 | Claude | | F16L 9/18 340/605 |
| 4,710,353 A * | 12/1987 | Tanaka | | G01M 3/165 385/12 |
| 4,735,095 A * | 4/1988 | Issel | | F17D 5/02 73/863.33 |
| 4,808,785 A * | 2/1989 | Vertz | | B23H 9/10 219/121.67 |
| 4,846,604 A * | 7/1989 | Holtmann | | B09B 1/00 405/129.5 |
| 5,046,353 A * | 9/1991 | Thompson | | G01M 3/22 73/40.7 |
| 5,138,153 A * | 8/1992 | Gergely | | G01M 3/047 250/227.18 |
| 5,140,847 A * | 8/1992 | Tausch | | F17D 5/06 174/11 R |
| 5,271,901 A * | 12/1993 | Issel | | F17D 5/02 405/129.5 |
| 5,301,538 A | 4/1994 | Recla | | |
| 5,343,037 A * | 8/1994 | Berkcan | | G01N 21/7703 250/227.18 |
| 5,378,995 A * | 1/1995 | Kudo | | G01M 3/165 174/11 R |
| 5,408,862 A * | 4/1995 | Elkins | | G01V 1/008 324/324 |
| 5,589,647 A * | 12/1996 | Jax | | G01M 3/04 73/31.07 |
| 5,625,138 A * | 4/1997 | Elkins | | G01V 1/008 324/324 |
| 5,708,218 A * | 1/1998 | Jax | | G01M 3/04 73/31.02 |
| 5,992,217 A * | 11/1999 | Jax | | F17D 5/06 73/40 |
| 6,088,417 A * | 7/2000 | Jax | | G21C 17/017 376/250 |
| 6,898,962 B2 * | 5/2005 | Jax | | G01M 3/22 73/40 |
| 7,155,961 B2 | 1/2007 | Fernandes | | |
| 7,270,019 B2 * | 9/2007 | Issel | | G01M 3/22 73/31.07 |
| 7,770,435 B2 * | 8/2010 | Issel | | F16L 11/12 73/40 |
| 7,779,526 B2 * | 8/2010 | Storb | | F17D 5/02 29/450 |
| 7,802,465 B2 * | 9/2010 | Issel | | F17D 5/06 73/40.7 |
| 8,418,529 B2 * | 4/2013 | Coudray | | G01M 3/002 73/40.5 R |
| 8,429,957 B2 * | 4/2013 | Stedman | | G01N 15/06 73/114.71 |
| 8,460,203 B2 * | 6/2013 | Ricciardelli | | A61B 5/091 600/538 |
| 8,875,563 B2 * | 11/2014 | Fleischer | | G01M 3/22 73/52 |
| 9,103,742 B2 * | 8/2015 | Fleischer | | G01M 3/22 |
| 9,823,184 B1 * | 11/2017 | Challener | | G02B 6/02 |
| 9,910,237 B2 | 3/2018 | Spijker | | |
| 10,126,212 B2 * | 11/2018 | Knoblach | | G01N 1/26 |
| 10,365,180 B2 * | 7/2019 | Aquino | | B29C 70/00 |
| 2003/0172741 A1 * | 9/2003 | Busch | | G01N 1/2252 73/861.21 |
| 2003/0213300 A1 * | 11/2003 | Jax | | G01M 3/04 73/432.1 |
| 2004/0094524 A1 * | 5/2004 | Stevens | | B23K 26/384 219/121.71 |
| 2004/0112117 A1 * | 6/2004 | Wright | | G01N 33/0014 73/25.01 |
| 2005/0103759 A1 * | 5/2005 | Li | | B23K 26/066 219/121.67 |
| 2005/0240115 A1 * | 10/2005 | Fay | | A61B 5/097 600/532 |
| 2010/0005860 A1 * | 1/2010 | Coudray | | G01M 3/22 73/40.5 R |
| 2010/0314249 A1 * | 12/2010 | Thanigachalam | | G01N 27/12 204/424 |
| 2011/0083669 A1 * | 4/2011 | Ricciardelli | | A61B 5/087 128/204.18 |
| 2014/0290343 A1 * | 10/2014 | Kulkarni | | G01M 3/002 73/40.5 R |
| 2015/0000382 A1 * | 1/2015 | Frucht | | G01M 3/04 73/49.1 |
| 2015/0160075 A1 | 6/2015 | Taverner et al. | | |
| 2017/0038230 A1 * | 2/2017 | Kshirsagar | | G01D 11/245 |
| 2017/0123147 A1 | 5/2017 | Brown et al. | | |
| 2017/0276894 A1 | 9/2017 | Green | | |
| 2017/0343433 A1 | 11/2017 | Hill | | |
| 2019/0071965 A1 * | 3/2019 | Jaaskelainen | | E21B 47/135 |
| 2019/0339240 A1 | 11/2019 | Karp et al. | | |

OTHER PUBLICATIONS

International Search Report and Written Opinion for International Application No. PCT/US2019/029917; International Filing Date Apr. 30, 2019; Report dated Aug. 16, 2019 (pp. 1-8).

* cited by examiner

GAS SENSOR SYSTEM

CROSS REFERENCE TO RELATED APPLICATIONS

This application claims the benefit of an earlier filing date from U.S. Provisional Application Ser. No. 62/665,211 filed May 1, 2018, the entire disclosure of which is incorporated herein by reference.

STATEMENT OF GOVERNMENT SUPPORT

This invention was made with Government support under contract number DE-AR0000543 awarded by the Department of Energy. The Government has certain rights in this invention.

BACKGROUND

In subterranean fluid transport industry, various systems exist for detecting leaks. Further, various systems exist for transporting fluids including formation fluids. Pipelines may be employed, for example, to transport natural gas to and/or from a refinery. In many cases, the pipelines are subterranean. In order to detect leaks, a sensor line can be buried with the pipeline.

A typical gas leak detector includes a sensing tube having an inlet, an outlet, and a sensor arranged at the outlet. The sensing tube is perforated, covered with a hydrophobic membrane and encased in a protective layer. The sensing tube is given time to soak and absorb any gases that may be leaking from the pipeline. After a selected period, a purge flow is introduced into the inlet; and fluid passing from the outlet is monitored for a selected gas.

If gas is detected, steps may be taken to correct any leaks. A location of the leak may be correlated to an amount of time passed from fluid introduction and gas detection. Current sensing technology is typically limited to pipe lines that are no more than about 10 kilometers (km) due to the time required for the purge flow to clear the sensing tube. Other factors which limit applications to shorter pipelines include the spreading of the leaking gas within the sensing tube during the purge. The spreading of the gas makes it more difficult to determine the leak location. That is, a typical sensing cycle for a 10 km sensing tube is about 24 hours; 18 hours of soaking and 6 hours for the purge flow. Further, forming the sensor is a time-consuming process. Therefore, the art would appreciate a sensor system that mighty be used over greater distances and could be easier and more cost efficient to produce.

SUMMARY

Disclosed is a gas sensor system including a sensing tube having an outer surface, and an inner surface defining a passage. A plurality of openings is formed through the outer surface and the inner surface. Each of the plurality of openings being no greater than 0.5 millimeters (mm) in diameter. A hydrophobic sealant layer covers the sensing tube. A protective layer covers the hydrophobic sealant layer. A sensor node is arranged along the sensing tube. The sensor node includes an inlet fluidically connected to the passage, an outlet fluidically connected to the passage, and an interior chamber arranged between the inlet and the outlet. A sensor element is arranged in the sensor node. The sensor element includes a first end and a second end. A sensor cable extends along the sensing tube. The sensor cable includes a first section connected to the first end of the sensor element and a second section connected to the second end of the sensor element.

Also disclosed is a sensor node for detecting subterranean gas leaks including an inlet, an outlet, and an interior chamber arranged between the inlet and the outlet. The interior chamber includes a flow diverter. A sensor element is arranged in the sensor node. The sensor element includes a first end and a second end. A sensor cable includes a first section connected to the first end of the sensor element and a second section connected to the second end of the sensor element.

Further disclosed is a gas sensing tube including an outer surface, and an inner surface defining a passage. A plurality of openings is formed through the outer surface and the inner surface. Each of the plurality of openings has a diameter that no greater than 0.5 millimeters (mm) in diameter. A hydrophobic sealant layer covers the gas sensing tube, and a protective layer covering the hydrophobic sealant layer.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
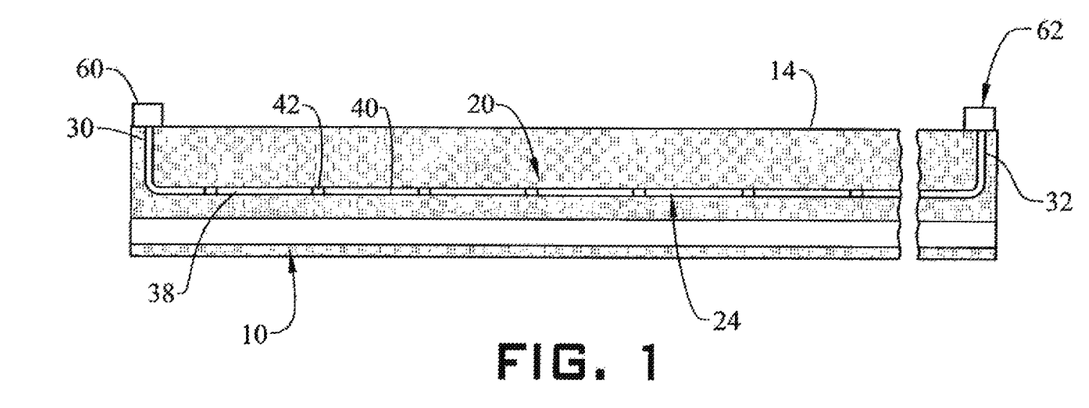
FIG. 1 depicts a subterranean gas line and gas sensor system including a gas sensing tube and a plurality of sensor nodes, in accordance with an aspect of an exemplary embodiment.
Figure 2:
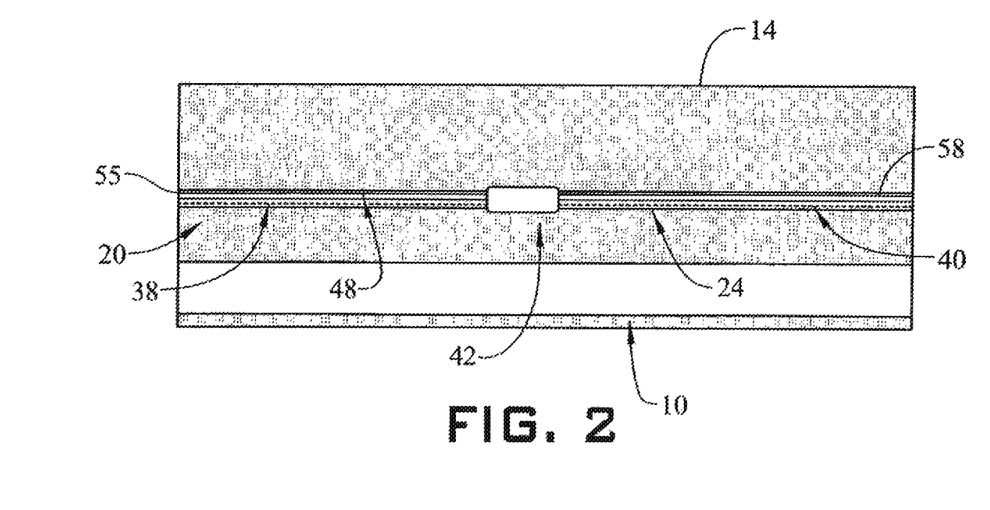
FIG. 2 depicts a portion of the gas sensor system of FIG. 1, in accordance with an exemplary aspect.

Referring to FIGS. 1 and 2, a gas pipeline is indicated generally at 10. Gas pipeline 10 may take the form of a subterranean pipeline buried beneath a surface 14. At this point, it should be understood that surface 14 may an exposed surface or surface 14 could represent a submersed surface. A gas sensor system 20 is buried adjacent to and above gas pipeline 10. In the embodiment shown, gas sensor system 20 is positioned above gas pipeline 10. However, it should be understood that the particular orientation of gas sensor system 20 relative to gas pipeline 10 may vary. It should also be understood that the gas sensor system described herein may be employed in connection with above-ground pipelines. Gas sensor system 20 is configured to detect leaks that may occur in gas pipeline 10.

Gas sensor system 20, in accordance with an exemplary aspect, includes a sensing tube 24 including a first end 30 and a second end 32. Second end 32 may be separated from first end 30 by a distance up to 100 kilometers (km) or more. Sensing tube 24 may be formed from a number of sections. For example, as first sensing tube section 38 may be connected to a second sensing tube section 40 by a sensor node 42. The number of sensing tube sections and sensor nodes may vary. Further a distance between adjacent sensor nodes may vary and could be up to 10 km or more. A sensing cable 48 extends along sensing tube 24. Sensing cable 48 may include a first section 55 that extends to, for example, sensor node 42 and a second section 58 that extends from sensor node 42 to a next sensor node (not separately labeled).

Sensing tube 24 and sensor cable 48 may be connected to a first control portion 60 arranged at, for example, first end 30 and a second control portion 62 arranged at, for example, second end 32. As will be discussed herein, first control portion 60 may introduce a purge fluid, such as air, to purge sensing tube 24 following a soak period. First control portion 60 may also introduce a control signal into sensor cable 48. Second control portion 62 may read the control signal for signs of gas. Of course, purge fluid, control signals, and detection of signs of gas may be initiated from first control portion 60 or second control portion 62. In that aforementioned example, only a single control portion would be employed.

In accordance with an exemplary aspect, sensing tube 24 may be allowed to "soak" or absorb any gas that may be present adjacent to gas pipeline 10 for a first period of time. After the first period of time, the purge fluid may be initiated for a second period of time. The purge fluid may take the form of pressurized air that may purge any gas in sensing tube 24 toward a sensor node. The second period of time may be about one-third that of the first period of time so that any leaking gas that has diffused into the sensing tube 24 during the first period of time does not have enough time to substantially completely diffuse back out prior to being detected. During the second period of time, sensor nodes 42 together with first and/or second control portions detect for signs of gas.

Figure 3:
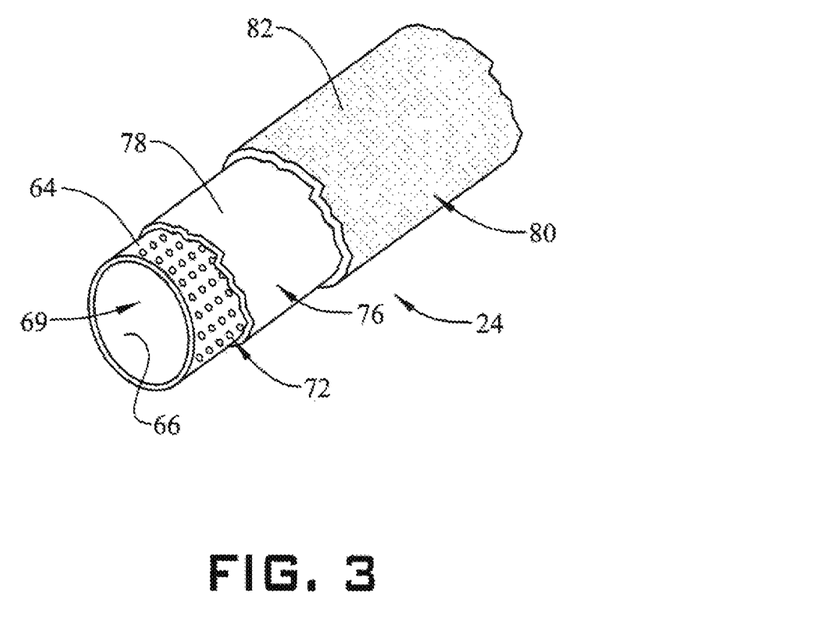
FIG. 3 depicts a partial cross-sectional view of the gas sensing tube, in accordance with an exemplary aspect.

Referring to FIG. 3, sensing tube 24 includes an outer surface 64 and an inner surface 66 that defines a passage 69. A plurality of openings 72 are formed sensing tube 24. Openings 72 extend from outer surface 64 through inner surface 66 to passage 69. Openings 72, as will be discussed herein, allow any gas that may be leaking from gas pipeline 10 to diffuse into passage 69. In an exemplary aspect, openings 72 have a diameter that is no greater than about 0.5 millimeter (mm). In another exemplary aspect, openings 72 have a diameter that is no greater than about 2 microns.

Sensing tube 24 also includes a hydrophobic covering 76 which may take the form of a silicone sealant layer 78. Sensing tube 24 may also include a protective layer 80 that may take the form of a braided sleeve 82. Silicone sealant layer 78 may be formed by applying liquid silicone to outer surface 64. The liquid silicone is allowed to cure and bond with outer surface 64 to form silicone sealant layer 78. An optional adhesion promoting substance (not shown) may be applied prior to application of silicone sealant layer 78 to provide a stronger bond with sensing tube 24. Silicone sealant layer 78 is hydrophobic yet allows gas, such as for example, natural gas, if present, to pass into passage 69. In an exemplary aspect, openings 72 are sized such that liquid silicone cannot penetrate. That is, the openings are sized such that the liquid silicone will not create clogs or pass into passage 69. It should be understood that other materials may be employed to create the hydrophobic covering.

Figure 4:
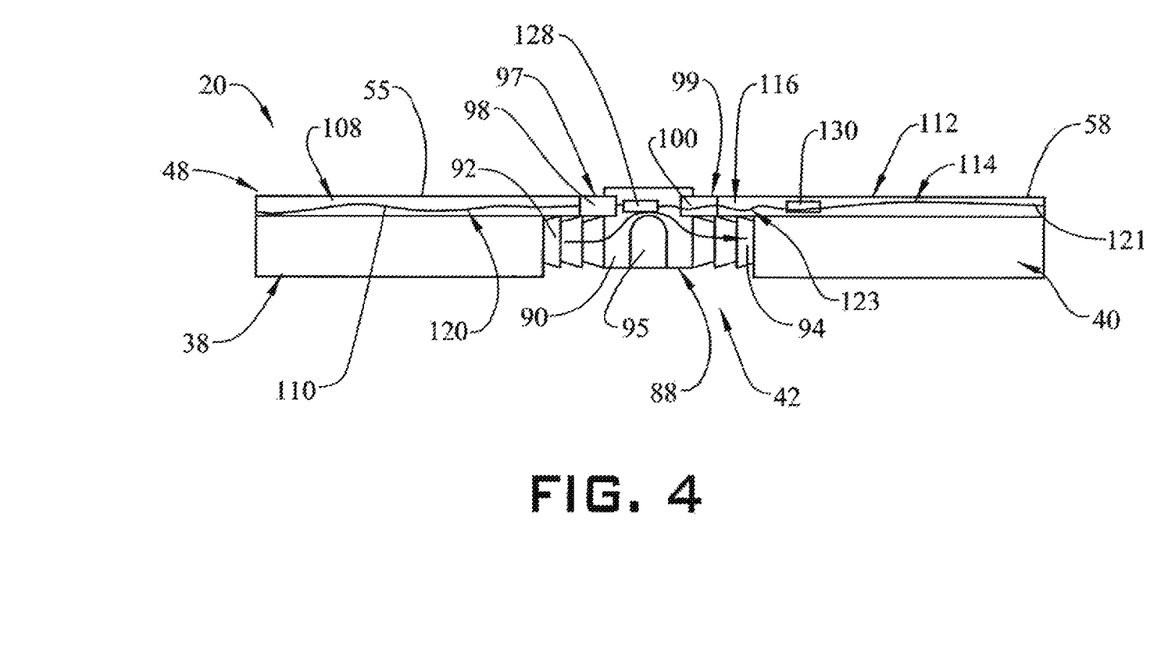
FIG. 4 depicts a sensor node in accordance with an aspect of an exemplary embodiment.

Reference will now follow to FIG. 4 in describing sensor node 42 in accordance with an exemplary aspect. Sensor node 42 includes a body 88 defining an interior or sensing chamber 90. Sensing chamber 90 includes an inlet 92 and an outlet 94. Inlet 92 may be connected to first sensing tube section 38 while outlet 94 may be connected to second sensing tube section 40. A flow diverter 95 may be arranged between inlet 92 and outlet 94. Sensor node 42 also includes a first connector 97 and a first seal 98 and a second connector 99 and a second seal 100.

A first conduit 108 defining first section 55 of sensor cable 48 may be connected to first connector 97. A first conductor 110 may pass through first conduit 108 into sensing chamber 90 via first seal 98. A second conduit 112 that may define second section 58 of sensor cable 48 may be connected to second connector 99. Second conduit 112 may support a second conductor 114. A third conductor 116 may connect with first conductor 110 and second conductor 114 and pass through sensing chamber 90.

In accordance with an exemplary aspect, first conductor 110 may take the form of a solid core optical fiber 120; second conductor 114 may take the form of a solid core optical fiber 121; and third conductor 116 may take the form of a hollow core optical fiber 123. First conductor 110 may be connected to first end section (not separately labeled) of third conductor 116 with a first coupler 128 and second conductor 114 may be connected to a second end (also not separately labeled) of third conductor 116 with a second coupler 130.

During the purge, the fluid pressure at one of first and second ends 30 and 32 of sensing tube 24 is raised with respect to the other of first and second ends 30 and 32 of sensing tube 24 by means of a pump or other apparatus. This causes the fluid to flow through passage 69. One of first and second ends 30 and 30 may be maintained at atmospheric pressure or higher, and the other of first and second ends 30 and 32 may be at a higher pressure. All intermediate points along sensing tube 24 are, therefore, also above atmospheric pressure.

In particular, sensing chamber 90 is at an elevated pressure with respect to the outside atmospheric pressure during the purge cycle. Coupler 128 within sensing chamber 90 is at a higher pressure than coupler 130 which is located outside of pressure chamber 90 and thus may reside at atmospheric pressure. Seals 98 and 100 maintain the pressure differential during the purge cycle. Therefore, the end of the third conductor 116 within sensing chamber 90 is at a higher pressure than the other end of third conductor 116. This causes gas within sensing chamber 90 to enter into third conductor 116 and flow through to and exit second coupler 130. The presence of flow diverter 95 causes the purge flow and any entrained gas passing through sensor node 42 to flow across first coupler 128 and part of this gas then enters third conductor 116. The gas may alter a control signal, such as a light signal, passing through sensor cable 48. The alteration of the control signal may represent the presence of leaking gas at a particular node.

Figure 5:
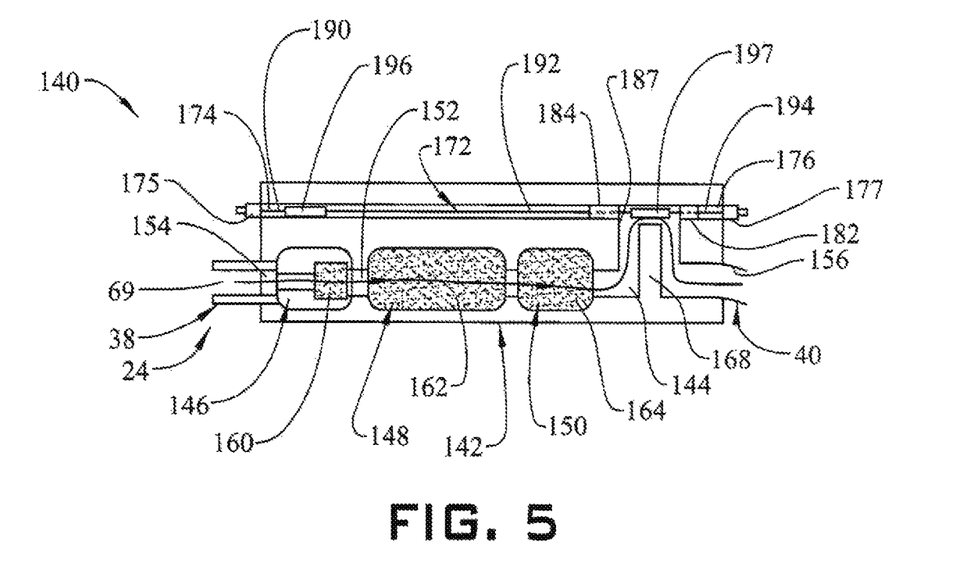
FIG. 5 depicts a sensor node in accordance with another aspect of an exemplary embodiment.

Reference will now follow to FIG. 5 in describing a sensor node 140 in accordance with another aspect of an exemplary embodiment. Sensor node 140 includes a body 142 defining an interior or sensing chamber 144. In the embodiment shown, sensing chamber 144 includes a first fluid treatment portion 146, a second fluid treatment portion 148 and a third fluid treatment portion 150. It should be understood that the number and arrangement of fluid treatment portions may vary. Fluid treatment portions 146, 148, and 150 extend along a flow passage 152 having an inlet 154 and an outlet 156. Inlet 154 may be connected to first sensing tube section 38 while outlet 156 may be connected to second sensing tube section 40.

In accordance with an exemplary aspect, first fluid treatment portion 146 houses an air/fluid separator 160 that may absorb or divert any fluid in the purge fluid flowing through passage 69. Second fluid treatment portion 148 may house a desiccant 162 that may absorb additional liquids and water vapor that may be present in the purge fluid flowing through passage 69. Third fluid treatment zone 150 may house a particulate filter 164 that traps particulate that may be flowing with the purge fluid passing through passage 69. In addition, sensing chamber 144 may include a flow diverter 168 that is arranged downstream of first, second and third fluid treatment zones 146, 148 and 150. Flow diverter 168 re-directs the purge fluid and any entrained gas passing through sensor node 140 as will be detailed herein.

In further accordance with an exemplary embodiment, sensor node 140 includes a sensor passage 172 that extends outwardly of, and fluidically connected with, flow passage 152. Sensor passage 172 includes a first end portion 174 provided with a first connector 175, a second end portion 176 provided with a second connector 177, and an intermediate portion (not separately labeled) extending therebetween. Sensor passage 172 may be at ambient pressure and sensing chamber 144 may be at a pressure different than ambient due to the purge flow. A first seal 182 may be provided at second end portion 176 and a second seal 184 may be provided along intermediate portion 179. First and second seals 182 and 184 may isolate sensor passage 172 from sensing chamber 144. In the exemplary embodiment shown, a discontinuity 187 exists along the intermediate portion of sensor passage 172 at flow diverter 168. As will be detailed below, discontinuity 187 provides access to sensor cable 48.

In accordance with an exemplary aspect, a first conductor 190 of sensor cable 48, which may take the form of a solid core optical fiber, extends through first connector 175 into sensor passage 172. A second conductor 192 of sensor cable 48, which may take the form of a hollow core optical fiber, is connected to first conductor 190 and a third conductor 194 of sensor cable 48, which may take the form of a solid core optical fiber, is connected to second conductor 192 and extends though second connector 176. A first coupler 196 connects first conductor 190 and second sensor fiber 102 and a second coupler 198 connects second conductor 192 with third conductor 194. Both of first and second couplers 196 and 198 are gas permeable.

Figure 6:
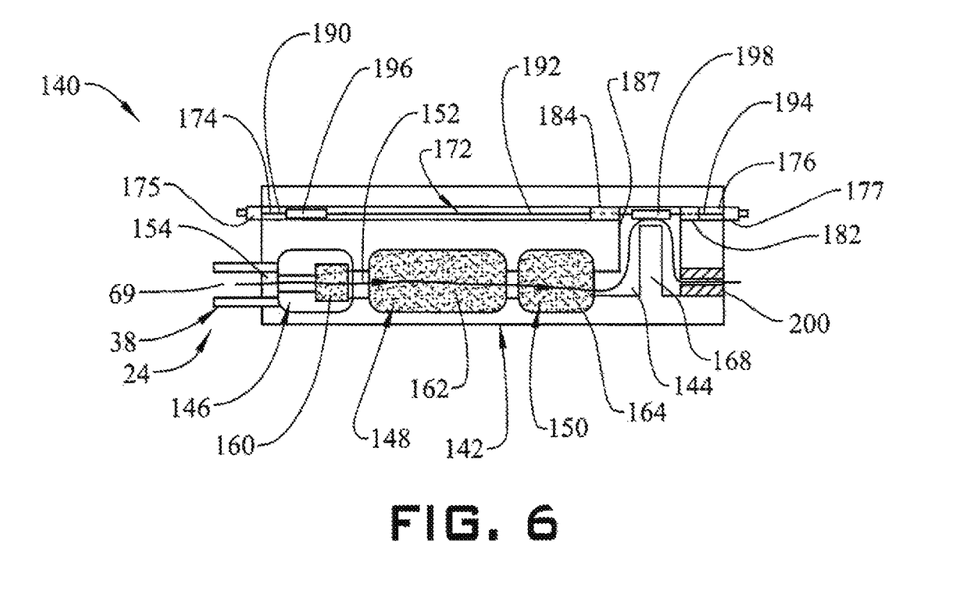
FIG. 6 depicts a sensor node in accordance with yet another aspect of an exemplary embodiment.

In accordance with an exemplary aspect, the purge fluid, such as air, may flow along passage 69 into sensor node 140. The fluid may pass through various fluid treatment devices such as air; liquid separator 160, desiccant 162 and/or particulate filter 164 and reach flow diverter 168. Flow diverter 168 re-directs the purge fluid toward second coupler 198. Any gas that may be in the fluid will permeate into second coupler 198 and into second conductor 192 to be detected by first control portion 60 or second control portion 62. It should be understood that a flow restrictor 200 may be arranged at outlet 156 to enhance residence time of the purge fluid at second coupler 198 such as shown in FIG. 6, wherein like reference numbers represent corresponding parts in the respective views.

Figure 7:
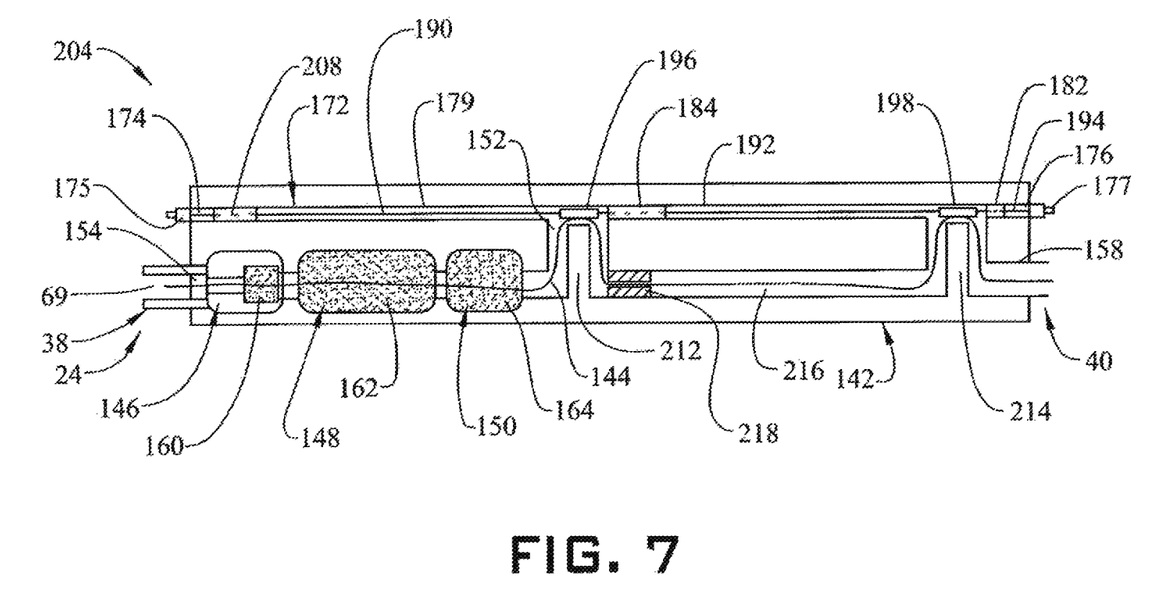
FIG. 7 depicts a sensor node in accordance with still yet another aspect of an exemplary embodiment.

Reference will now follow to FIG. 7, wherein like reference numbers represent corresponding parts in the respective views, in describing a sensor node 204 in accordance with another aspect of an exemplary embodiment. Sensor node 204 includes an additional seal 208 arranged in sensor passage 172 at first end portion 174. The incorporation of the additional seal 208 coupled with one of a negative and a positive pressure in sensing chamber 144 enables sensor node 204 and sensing tube 24 to be utilized in above ground applications. Sensor node 204 also includes a first flow diverter 212 and a second flow diverter 214. Second flow diverter 214 is arranged downstream of first flow diverter 212. A flow passage section 216 extends between first and second flow diverters 212 and 214. A flow restrictor 218 is arranged in flow passage section 216. Flow restrictor 218 creates a pressure drop between coupler 196 and coupler 198 across second conductor 192 that causes some of the gas to flow into, for example, first coupler 196. The gas entering first coupler 196 may pass through second conductor 192 and exit from second coupler 198.

Figure 8:
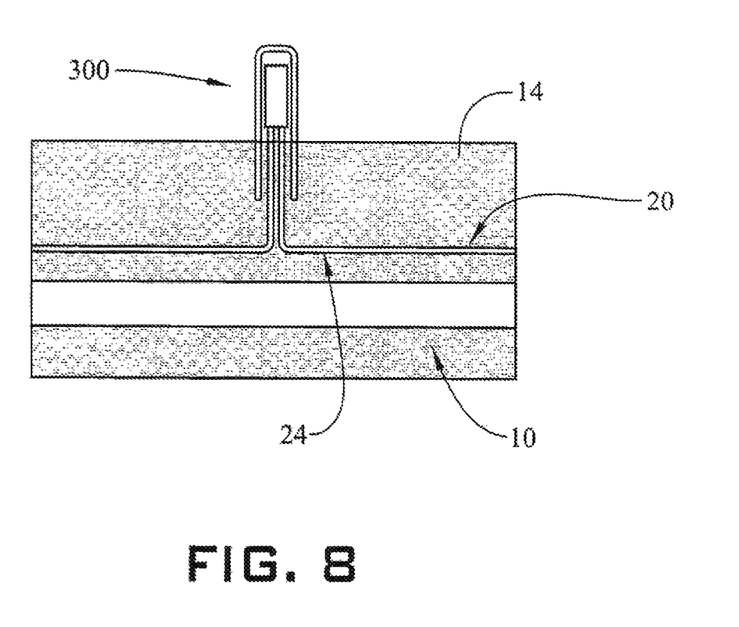
FIG. 8 depicts an above ground sensor node in accordance with an aspect of an exemplary embodiment.

At this point, it should be understood that the exemplary embodiments describe a system for detecting gas that may be leaking from a subterranean pipe line. Further, the exemplary embodiments describe a system that enables gas detection over distances that are longer than currently possible. By providing multiple sensor nodes that can be read from a single location, gas detection may be extended up to 100 km or longer. Still further, while the sensor nodes are described and shown as being below ground, it should be understood that a sensor node such as indicated at 300 in FIG. 8, may also be positioned above ground for easy access that enhances maintenance and fluid treatment media replacement.

Set forth below are some embodiments of the foregoing disclosure:

Embodiment 1: A gas sensor system comprising a sensing tube including an outer surface, and an inner surface defining a passage, a plurality of openings formed through the outer surface and the inner surface, each of the plurality of openings being no greater than 0.5 millimeters (mm) in diameter, a hydrophobic sealant layer covering the sensing tube, a protective layer covering the hydrophobic sealant layer, a sensor node arranged along the sensing tube, the sensor node including an inlet fluidically connected to the passage, an outlet fluidically connected to the passage and an interior chamber arranged between the inlet and the outlet, a sensor element arranged in the sensor node, the sensor element including a first end and a second end, and a sensor cable extending along the sensing tube, the sensor cable including a first section connected to the first end of the sensor element and a second section connected to the second end of the sensor element.

Embodiment 2: A sensor node for detecting subterranean gas leaks comprising an inlet, an outlet, and an interior chamber arranged between the inlet and the outlet, the interior chamber including a flow diverter, a sensor element arranged in the sensor node, the sensor element including a first end and a second end, and a sensor cable including a first section connected to the first end of the sensor element and a second section connected to the second end of the sensor element.

Embodiment 3: The sensor node as in any prior embodiment, wherein the sensor node includes a particulate filter in the interior chamber.

Embodiment 4: The sensor node as in any prior embodiment, wherein the sensor node includes a desiccant in the interior chamber.

Embodiment 5: The sensor node as in any prior embodiment, wherein the sensor node includes an air/liquid separator in the interior chamber.

Embodiment 6: The sensor node as in any prior embodiment, wherein the interior chamber of the sensor node includes a fluid treatment portion fluidically connected to the inlet arranged in the interior chamber arranged upstream of the flow diverter.

Embodiment 7: The sensor node as in any prior embodiment, wherein the fluid treatment portion includes at least one of an air/liquid separator, a desiccant, and a particulate filter.

Embodiment 8: The sensor node as in any prior embodiment, further comprising: a flow restrictor arranged in the interior chamber.

Embodiment 9: The sensor node as in any prior embodiment, wherein the first section of the sensor cable defines a first conductor, and the sensor element defines a second conductor, the first conductor extending through the sensor cable and a second sensor conductor extending through the sensor node.

Embodiment 10: The sensor node as in any prior embodiment, wherein the first conductor comprises a solid core optical fiber and the second conductor comprises a hollow core optical fiber.

Embodiment 11: The sensor node as in any prior embodiment, wherein the sensor node includes a sensor passage having a first end portion, a second end portion, and an intermediate portion, the first end portion being receptive of the first conductor of the sensor cable and the second end portion being receptive of the second conductor of the sensor cable, at least one of the first and second conductors passing through the sensor passage.

Embodiment 12: The sensor node as in any prior embodiment, wherein the sensor passage includes a discontinuity and a flow diverter arranged at the discontinuity.

Embodiment 13: The sensor node as in any prior embodiment, wherein the first conductor is connected to the second conductor by a coupler, the coupler being arranged at the discontinuity.

Embodiment 14: The sensor node as in any prior embodiment, further comprising a first coupler connecting the first conductor with the second conductor and a second coupler connecting the second conductor with a third conductor, one of the first and second couplers being arranged in the sensor passage and the other of the first and second couplers being arranged at the discontinuity.

Embodiment 15: A gas sensing tube comprising an outer surface, and an inner surface defining a passage, a plurality of openings formed through the outer surface and the inner surface, each of the plurality of openings having a diameter that no greater than 0.5 millimeters (mm) in diameter, a hydrophobic sealant layer covering the gas sensing tube, and a protective layer covering the hydrophobic sealant layer.

Embodiment 16: The gas sensing tube as in any prior embodiment, wherein the each of the plurality of openings include a diameter that is no greater than 200 microns.

Embodiment 17: The gas sensing tube as in any prior embodiment, wherein the hydrophobic sealant layer is bonded to the gas sensing tube.

Embodiment 18: The gas sensing tube as in any prior embodiment, wherein the hydrophobic sealant layer comprises silicone sealant cured in situ on the gas sensing tube.

Embodiment 19: The gas sensing tube as in any prior embodiment, wherein the hydrophobic sealant layer comprises silicone.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A gas sensor system comprising:
   a sensing tube including an outer surface, and an inner surface defining a passage;
   a plurality of openings formed through the outer surface and the inner surface, each of the plurality of openings being no greater than 0.5 millimeters (mm) in diameter;
   a hydrophobic sealant layer covering the sensing tube;
   a protective layer covering the hydrophobic sealant layer;
   a sensor node arranged along the sensing tube, the sensor node including an inlet fluidically connected to the passage, an outlet fluidically connected to the passage and an interior chamber arranged between the inlet and the outlet;
   a sensor element arranged in the sensor node, the sensor element including a first end and a second end; and
   a sensor cable extending along the sensing tube, the sensor cable including a first conduit having a first connector connected to the first end of the sensor element and a second conduit having a second connector connected to the second end of the sensor element, the sensor cable having a first conductor extending through the first conduit and being coupled to the first connector and a second conductor extending through the second conduit and being coupled to the second connector.

2. A sensor node for detecting subterranean gas leaks comprising:
   an inlet, an outlet, and a sensing chamber arranged between the inlet and the outlet, the sensing chamber including a flow diverter;
   a sensor element arranged in the sensor node radially outwardly of the flow diverter, the sensor element including a first end and a second end; and
   a sensor cable including a first section connected to the first end of the sensor element and a second section connected to the second end of the sensor element.

3. The sensor node according to claim 2, wherein the sensor node includes a particulate filter in the sensing chamber.

4. The sensor node according to claim 2, wherein the sensor node includes a desiccant in the sensing chamber.

5. The sensor node according to claim 2, wherein the sensor node includes an air/liquid separator in the sensing chamber.

6. The sensor node according to claim 2, wherein the sensing chamber of the sensor node includes a fluid treatment portion fluidically connected to the inlet arranged in the sensing chamber arranged upstream of the flow diverter.

7. The sensor node according to claim 6, wherein the fluid treatment portion includes at least one of an air/liquid separator, a desiccant, and a particulate filter.

8. The sensor node according to claim 2, further comprising: a flow restrictor arranged in the sensing chamber.

9. The sensor node according to claim 2, wherein the first section of the sensor cable defines a first conductor, and the sensor element defines a second conductor, the first conductor extending through the sensor cable and a second sensor conductor extending through the sensor node.

10. The sensor node according to claim 9, wherein the first conductor comprises a solid core optical fiber and the second conductor comprises a hollow core optical fiber.

11. The sensor node according to claim 9, wherein the sensor node includes a sensor passage having a first end portion, a second end portion, and an intermediate portion, the first end portion being receptive of the first conductor of the sensor cable and the second end portion being receptive of the second conductor of the sensor cable, at least one of the first and second conductors passing through the sensor passage.

12. The sensor node according to claim 11, wherein the sensor passage includes a discontinuity and a flow diverter arranged at the discontinuity.

13. The sensor node according to claim 12, wherein the first conductor is connected to the second conductor by a coupler, the coupler being arranged at the discontinuity.

14. The sensor node according to claim 12, further comprising: a first coupler connecting the first conductor with the second conductor and a second coupler connecting the second conductor with a third conductor, one of the first and second couplers being arranged in the sensor passage and the other of the first and second couplers being arranged at the discontinuity.

* * * * *